US006952316B2

(12) United States Patent
Tretter

(10) Patent No.: US 6,952,316 B2
(45) Date of Patent: Oct. 4, 2005

(54) OPEN HEAD DETECTION CIRCUIT AND METHOD IN A VOLTAGE OR CURRENT MODE DRIVER

(75) Inventor: Larry LeeRoy Tretter, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 10/290,979

(22) Filed: Nov. 8, 2002

(65) Prior Publication Data
US 2004/0090692 A1 May 13, 2004

(51) Int. Cl.[7] .............................................. G11B 27/36
(52) U.S. Cl. ......................................... 360/31; 360/68
(58) Field of Search ............................ 360/31, 46, 67, 360/68; 340/652; 324/210, 212, 226

(56) References Cited

U.S. PATENT DOCUMENTS

| 5,087,884 | A | 2/1992 | Brannon |
| 5,434,717 | A | 7/1995 | Yoshinaga et al. |
| 5,729,208 | A | 3/1998 | Ogiwara |
| 6,081,396 | A | 6/2000 | Ryat |
| 6,101,052 | A | 8/2000 | Gooding et al. |
| 6,208,043 | B1 | 3/2001 | Hurst et al. |
| 6,353,914 | B1 | 3/2002 | Emerson et al. |
| 6,687,064 | B1 * | 2/2004 | Jiang et al. .................. 360/31 |
| 2001/0010602 | A1 | 8/2001 | Takahashi |

FOREIGN PATENT DOCUMENTS

JP          60136910 A      7/1985

* cited by examiner

Primary Examiner—Alan T. Faber
(74) Attorney, Agent, or Firm—William D. Gill

(57) ABSTRACT

An open write head detection circuit is provided comprising a write head driver circuit, a programmable reference voltage source, a comparator and a pulse width filter. The write head driver circuit generates an voltage sense signal. The comparator compares the voltage sense signal with a reference voltage from the programmable reference voltage source and generates a comparator output signal indicative of whether the voltage sense signal is greater than or less than the reference voltage. The comparator output signal is input to the pulse width filter which generates a latched open head signal in response the voltage sense signal being less than the reference level for a predetermined time measured as a programmable number of write clock cycles.

17 Claims, 10 Drawing Sheets

Key To FIG. 4

OPEN HEAD DETECTION CIRCUIT AND METHOD IN A VOLTAGE OR CURRENT MODE DRIVER

BACKGROUND OF THE INVENTION

1. Field of the Invention

This invention relates generally to head drive circuitry and in particular to an improved head drive circuit which includes open head or open cable detection. More particularly, the present invention relates to a magnetic tape recorder write head drive circuit which provides open head detection in a voltage or current mode write driver.

2. Description of the Related Art

Write head drive circuits having an H configuration are well known in the prior art. Such circuits are typically utilized in applications in which current is to be supplied in one of two directions to a load, such as a magnetic write recording head in a magnetic tape recorder or a magnetic disk drive. H write driver circuits are relatively fast and have generally low power dissipation.

Reliability and serviceability are highly desirable characteristics in magnetic data recording systems for a computer memory system. It is important to detect fault conditions that result in errors in the data recording process. A common fault in magnetic write recording systems is a poor or open wire connection (in the circuit card, write head coil or connecting cable) from the write head drive circuit to the inductive write head coil it drives. The open connection to the write coil renders the system inoperable, since data cannot be written to the magnetic media on the tape or hard disk. It is important to detect this fault condition and alert the user so that prompt remedial action can be taken.

A number of circuits and methods for detecting the open circuit condition are known to the art. U.S. Pat. No. 5,729, 208 to H. Ogiwara describes a fault detection circuit integrated with the write driver using a comparator for comparing write head signals with a predetermined reference voltage level and generating differential comparison output signals. Latches coupled to the comparator use the write data as clock signals for latching differential comparison output signals just prior to polarity changes in the write head signals. A multiplexer coupled to the latches selects an output from the latches in response to the write data and generates an output indicative of an open circuit condition in the external write coil when the write head signals differ from an anticipated voltage reference level just prior to a predetermined polarity change in the write signal.

However, as data rates of magnetic recording systems have increased, the prior art solutions continue to have problems in reliably detecting faults. In particular, these circuits can indicate faults where none exist due to erroneous response to waveform transients.

Therefore, there is an ongoing need for an open write head detection circuit for magnetic recording systems that operates reliably at the highest write data rates.

SUMMARY OF THE INVENTION

It is the object of the present invention to disclose an open write head detection circuit that operates for both current and voltage mode write driver operation.

It is another object of the present invention to disclose an open write head detection circuit that uses a programmable reference for the open head comparator used to compare the write signal with a reference level.

It is yet another object of the present invention to disclose an open write head detection circuit that uses the write clock signal to determine the pulse width of a pulse width filter used to validate an open head condition.

It is a further object of the present invention to disclose an open write head detection circuit that uses a programmable pulse width filter to validate an open head condition.

It is a still further object of the present invention to disclose an open write head detection circuit that has a self checking function that allows verification of the reliability of the open head detection operation.

It is another object of the present invention to disclose a method of detecting and validating an open write head condition.

In accordance with the principles of the present invention, there is disclosed an open write head detection circuit comprising a write head driver circuit, a programmable reference voltage source, a comparator and a pulse width filter. In a first embodiment, the write head driver circuit is a voltage mode H configuration drive circuit with four drive transistors coupled to an external load device, such as magnetic tape recorder write head. First and second drive transistors are coupled to opposite ends of the load device and produce current flow through the load device in a first direction. Third and fourth drive transistors are coupled to opposite ends of the load device to produce a current flow through the load device in the opposite direction. The current through the load device is determined by the value of resistors in series with the load device and a voltage source. A resistance-capacitance network connected to one end of the load device is used to generate a raw open head/cable (voltage) sense signal in response to the write current.

The voltage sense signal is connected to the "−" input of the comparator. The programmable reference source output is connected to the "+" input of the comparator. The voltage level output of the programmable reference source is set to cause the output of the comparator to go to a logic 1 value during a short condition. Because of the possibility that the undershoot of the voltage sense signal could go below the voltage level of the "+" input of the comparator for a short period of time resulting in a false open signal, the output of the comparator is checked by the pulse width filter to verify that it is at a high level for a predetermined number of clock cycle.

The output of the comparator and the write clock signal are connected to the digital pulse width filter. The function of the pulse width filter is to only give an output indication of an open head/cable when the input from the comparator is high for the predetermined number of clock cycles. The digital pulse width filter includes a plurality, preferably 4 to 7, D clock flip flop circuits whose outputs are connected to a plurality of 2 to 1 multiplexers (MUX). Control signals to each of the plurality of MUX may be independently set to logic 1 or logic 0 levels. By proper setting of the MUX control signals, the number of clock cycles that the input of the comparator is high before an open head/cable output signal is generated may be selected.

In a second embodiment of the invention, the write head driver circuit is a current mode H configuration drive circuit. The resistors in series with the load device of the voltage mode drive circuit are eliminated and the current through the write head is determined by the value of a current source in the drive circuit. The programmable reference voltage source, comparator and pulse width filter are unchanged from the description of the first embodiment. Because the "raw" open head (voltage) sense signal from the current mode write driver circuit differs from that of the voltage mode driver circuit, a different value of the reference voltage to the comparator must be supplied from the programmable reference source. Subsequent operation of the comparator and pulse width filter is identical to that for the voltage mode driver embodiment.

The above as well as additional objects, features, and advantages of the present invention will become apparent in the following detailed description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1:
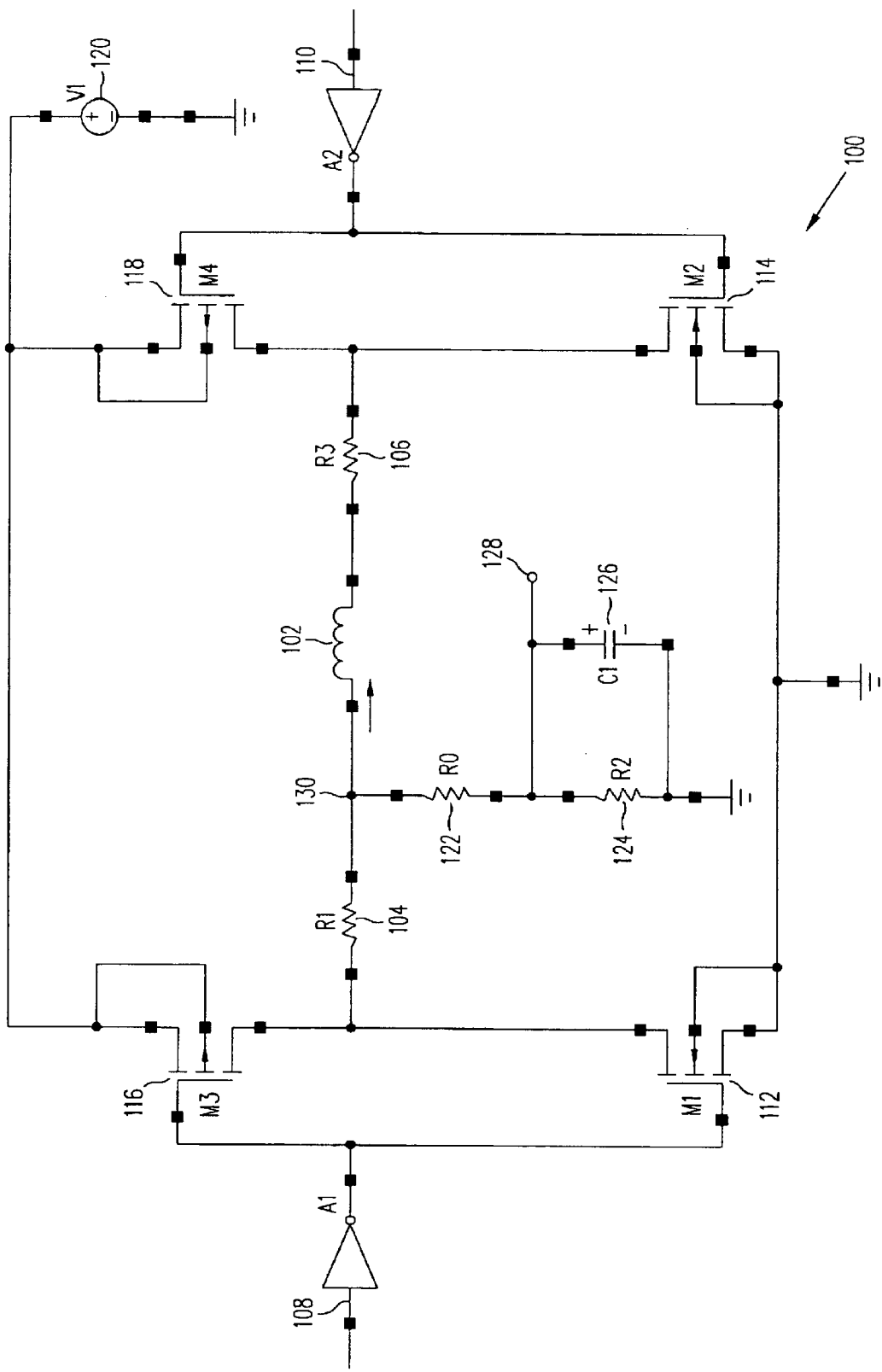
FIG. 1 is a schematic representation of an H configuration voltage mode write driver circuit having integral fault detection circuitry in accordance with the present invention.

FIG. 1 shows a schematic representation of a voltage mode H configuration magnetic write head driver circuit 100 according to a first embodiment of the present invention. As illustrated, the H configuration write driver circuit 100 is utilized to provide a bi-directional current flow through the externally connected write head 102 and the series resistors R1 104 and R3 106. In practice, inputs 108 and 110 through inverters A1 an A2 are used to control the conductivity of multiple field effect transistors (FETs) M1 112, M2 114, M3 116 and M4 118. When input 108 is set to V1 volts and input 110 is set to 0, the output of inverter A1 is 0 and the output of inverter A2 is V1. Then pFET M3 116 and nFET M1 114 are placed in a conductive state and nFET M1 112 and pFET M4 118 are in a nonconductive state. The voltage supply 120 causes current to flow through M3 116, R1 104, write head 102, R2 106 and M4 114 in a first direction from left to right.

Alternatively, input 108 may be set to 0 and input 110 is set to V1 so that the output of A1 is V1 and the output of A2 is 0 resulting in pFET M4 118 and nFET M1 112 being in a conductive state and nFET M2 114 and pFET M3 116 being nonconductive. In this manner current will flow from voltage supply 120 through M4 118, R3 106, write head 102, R1 104 and M1 112 in a second direction from right to left. The write driver current through the write head 102 is determined by the values of the resistors R1 and R3 and the voltage V1 of the voltage source 120 (the nFET devices M1 and M2 and the pFET devices M3 and M4 are designed to have a low voltage drop from source to drain when they are in a conductive state).

The voltage divider formed by resistors R0 122 and R2 124 connected between node 130 and ground are used to provide a sense signal at output 128. Capacitor C1 126 is used to remove some of the overshoot and undershoot transients of the sense signal during a normal write operation.

The components of the write current driver circuit 100 may be chosen to optimize the circuit depending on the desired write current and write frequency of the application. Typical values for the embodiment herein described are as follows. The write clock cycle frequency is in the range of 120–350 MHz. The voltage supply 120 was programmable in the range of 3–6 volts in order to change the magnitude of the write current by as much as 40–50%. Resistors R1 and R3 100, 104 each had a resistance of 51 Ω, R0 122 had a resistance 8.5 kΩ, R2 124 had a resistance of 11.4 kΩ and C1 126 had a capacitance of 0.6 pf.

Figure 2:
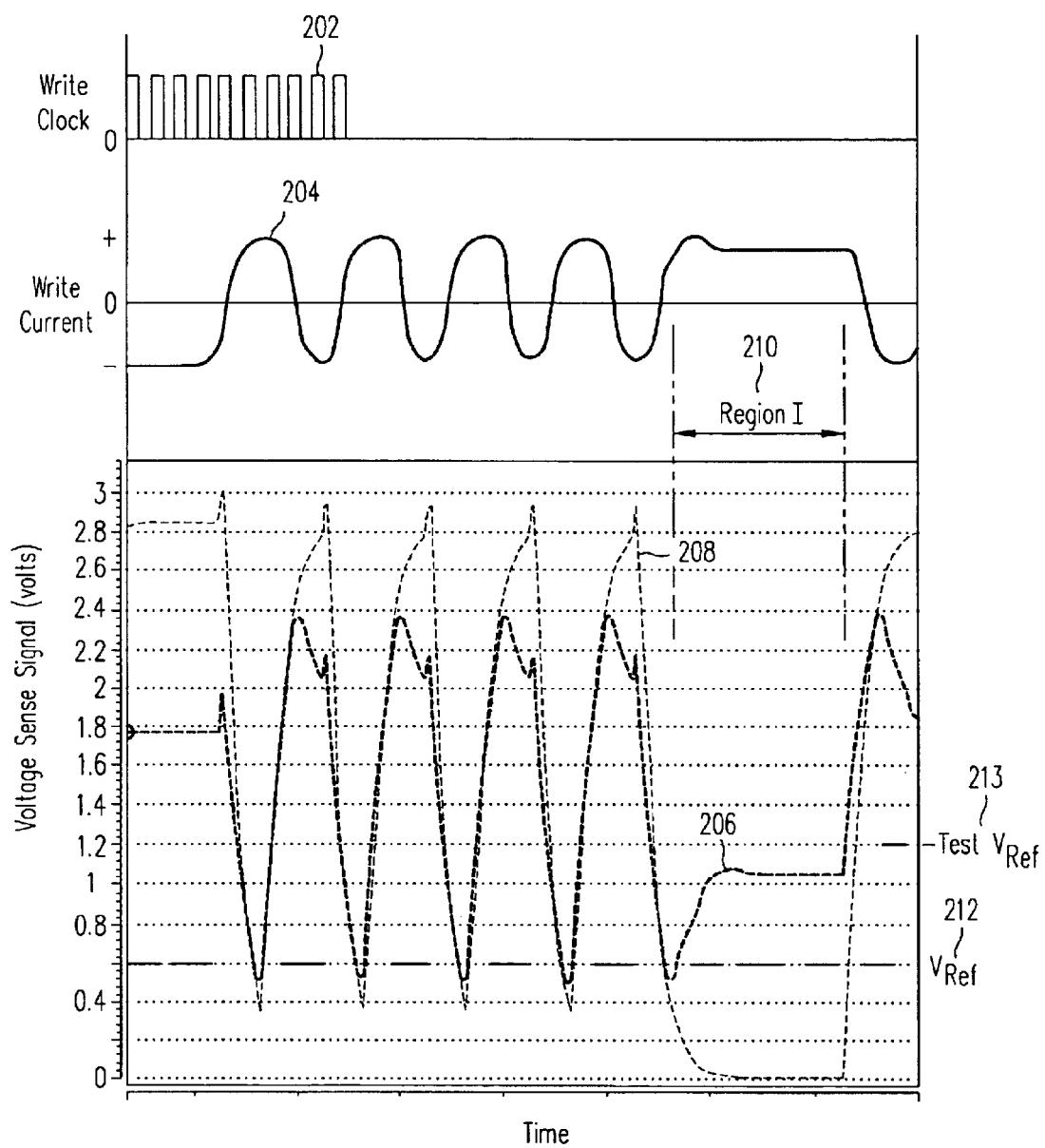
FIG. 2 is a timing diagram of certain signals appearing in the circuit shown in FIG. 1.

FIG. 2 is a timing diagram showing pictorial representations of the waveforms of a write clock signal 202, an exemplary write current 204 to the write head 102, and resultant voltage sense signals 206 (normal) and 208 (open head) measured at output 128 of the voltage mode write current drive circuit 100. Write clock signal 202 is a timing signal operating at a frequency in the driver are clocked (timed) on a rising edge of an on chip clock signal waveform 202.

Voltage sense signal 206 is the signal measured at output 128 during normal operation of the circuit. Voltage sense signal 208 is the signal measured at output 128 when the write head 102 or a connection to the write head is open so that no write current can flow. The write current 204 includes patterns that are written to separate data sets that have many write clock cycles where the data does not change as is known to those skilled in the art. The voltage sense signals 206 and 208 measured when data is unchanged for many write clock cycles are affected less by undershoot transients that may signal a "false" open head condition. From comparison of the voltage sense signals 206 and 208, it is clear that the signals are most readily distinguished from each other in region I 210 of FIG. 2 where the write head current is unchanged for many clock cycles. For this reason, in the present invention, validation of an open head condition requires the open head signal condition to persist for a sufficiently long interval, for example, a duration of 8 clock pulses. By comparing the magnitude of the observed voltage sense signal with a predetermined reference voltage ($V_{REF}$) 212 in region I 210, an "open" voltage sense signal 208 may be readily and reliably distinguished from a "normal" voltage sense signal 206. For the waveform of FIG. 2, the preferred magnitude of $V_{REF}$ 212 is in the range of 0.4 to 0.8 volt, preferably about 0.6 volt.

Figure 3:
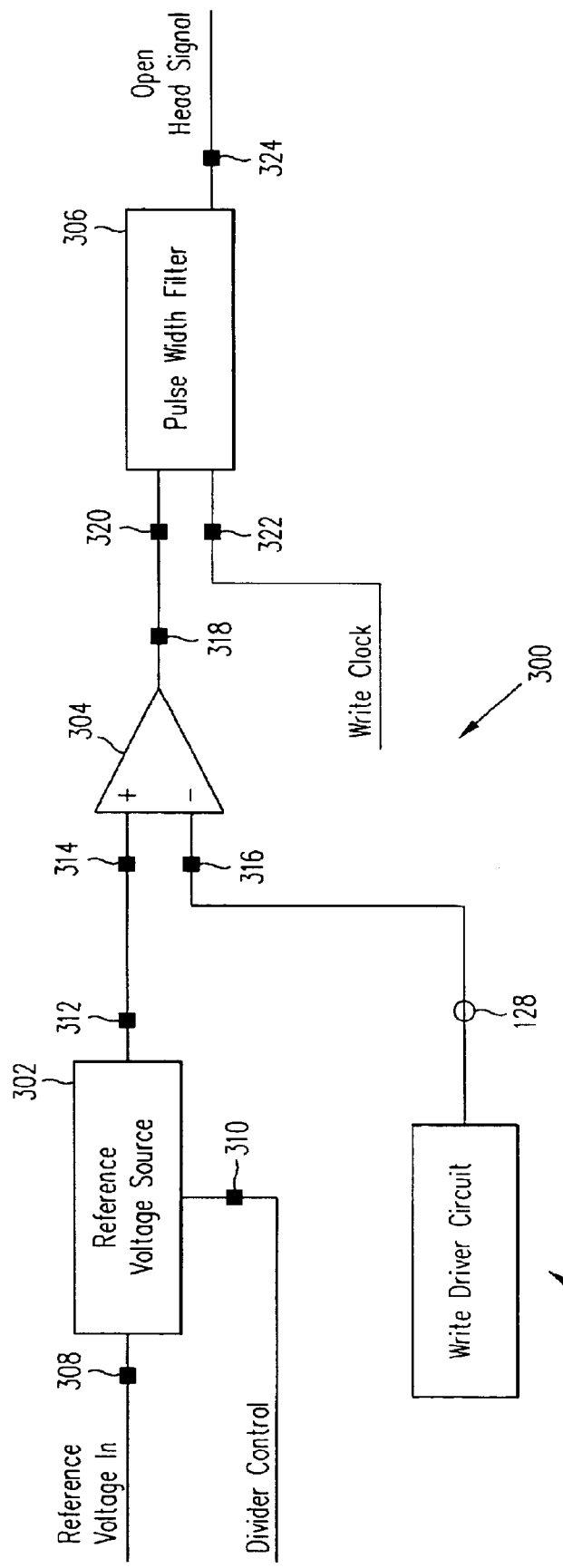
FIG. 3 is a block diagram of a circuit to detect an open write head in accordance with the present invention.

FIG. 3 is a block diagram of an open head detection circuit 300 used to detect an open write head in accordance with the present invention. The circuit 300 will be described with reference to FIGS. 1, 2 and 3. The circuit 300 comprises a write head driver circuit 100, a programmable reference voltage source 302, a comparator 304 and a pulse width filter 306. A reference voltage is provided at input 308 and a divider control signal is provided at input 310 of the programmable reference source 302. Computer control of the divider control signal enables a desired reference output voltage to be provided at output 312 of the programmable reference voltage source 302. The predetermined output reference voltage ($V_{REF}$) 212 provides the "+" input 314 to comparator 304. The voltage sense signal 206 or 208, depending on whether the head is normal or open (see FIG. 2), on the output 128 of write driver circuit 100 of FIG. 1 is connected to the "−" input 316 of comparator 304.

For proper operation of the open head detection circuit 300, the voltage output level of the programmable reference voltage source 302 at output 312 is set to cause the output of comparator 304 to go to a logic 1 value during an open condition of the write head 102. If the voltage level of the signal at the "−" input 316 of the comparator 304 goes below (i.e. more negative than) the voltage level at the "+" input 314, the output 318 of the comparator 304 will go to a logic level 1 signaling a potential open head/cable condition. However, because the transient undershoot of the voltage sense signal 206 during a normal write without an open head can cause the voltage sense signal to go below the voltage level at the "+" input of the comparator for a short period of time, resulting in a "false" open head condition at output 318, means to verify a "true" open head fault is needed. The pulse width filter 306 provides the needed verification. The output 318 of the comparator 304 is connected to the input 320 of the pulse width filter 306.

The function of the pulse width filter 306 is to distinguish a "false" open head condition which may result from a transient response from a "true" open head condition. This function is accomplished by ensuring that a valid open head signal is only generated at the output 324 of the filter 306 when the output signal 318 of the comparator 304 remains at a high (logic 1) level for a sufficient period of time to allow transient undershoot of the open head sense signal to die away so that a reliable evaluation of the voltage level of the voltage sense signal can be made. The write clock signal 202 connected to input 322 is used to set the pulse width filter 306 to a desired period of time measured in terms of write clock cycles as described hereafter.

Figure 4A:
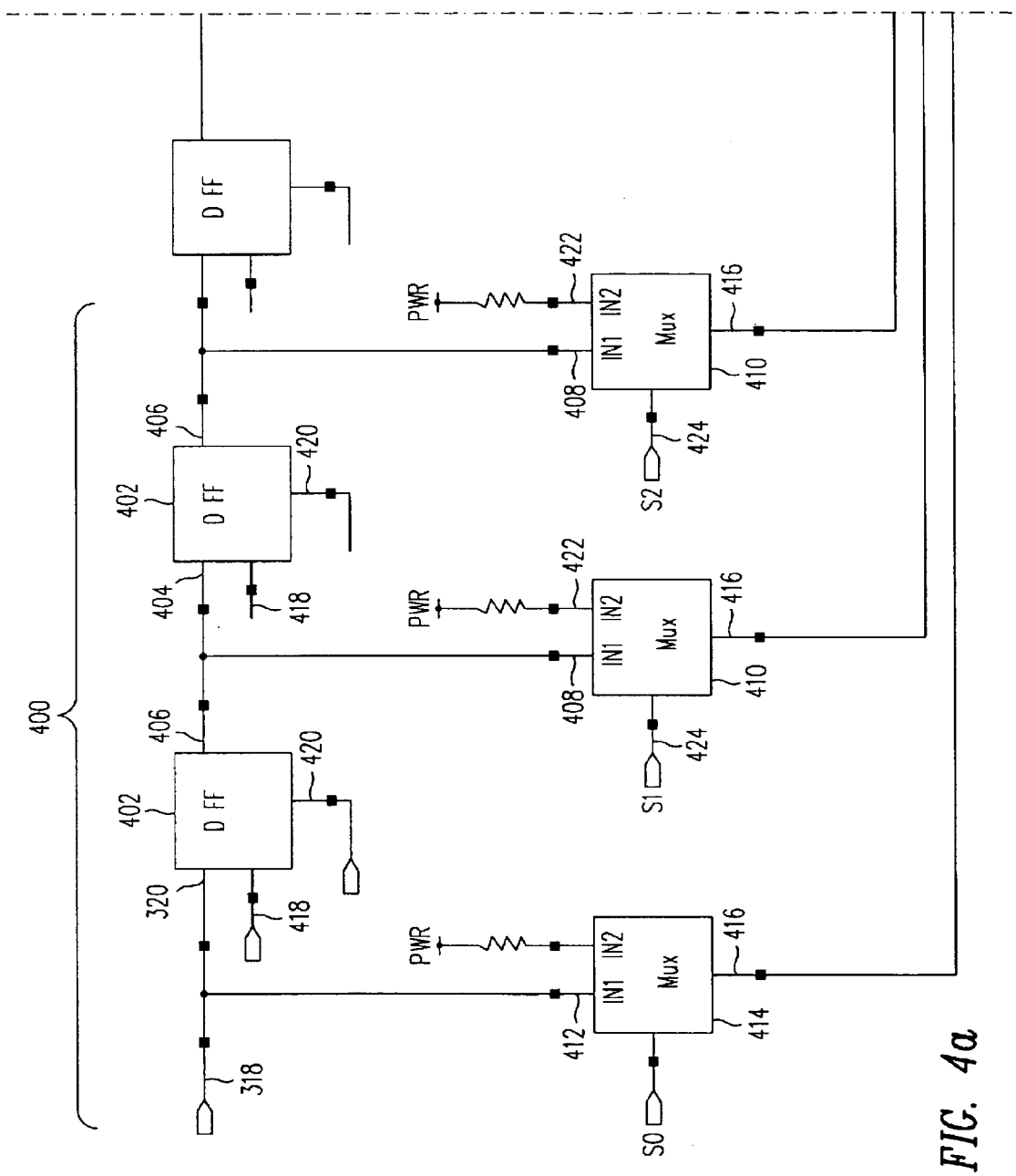
FIG. 4 is a schematic representation of a pulse width filter used in the circuit depicted in FIG. 3 to detect an open write head in accordance with the present invention.
Figure 4A:
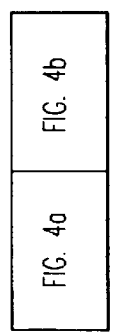
Figure 4B:
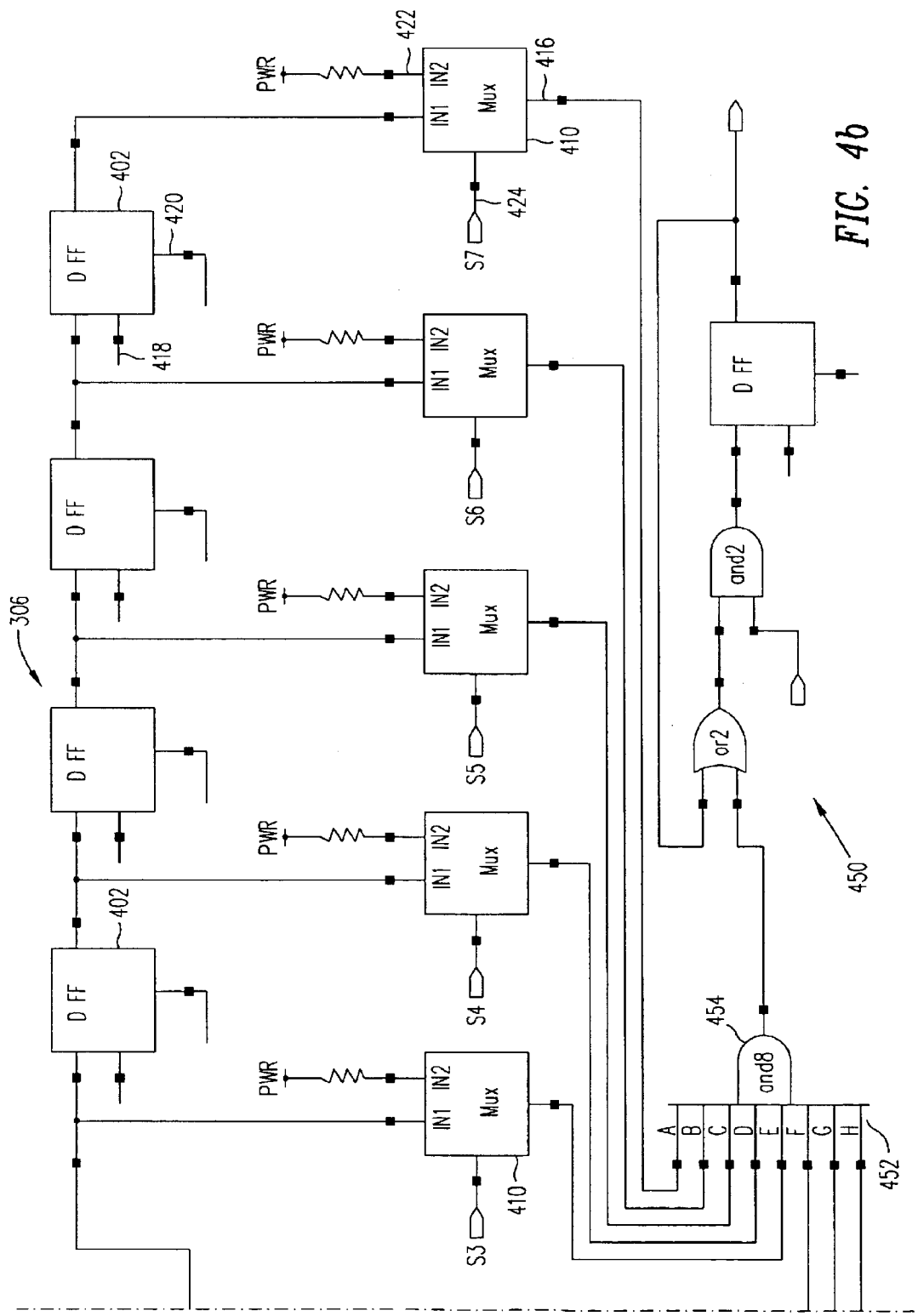
Figure 5:
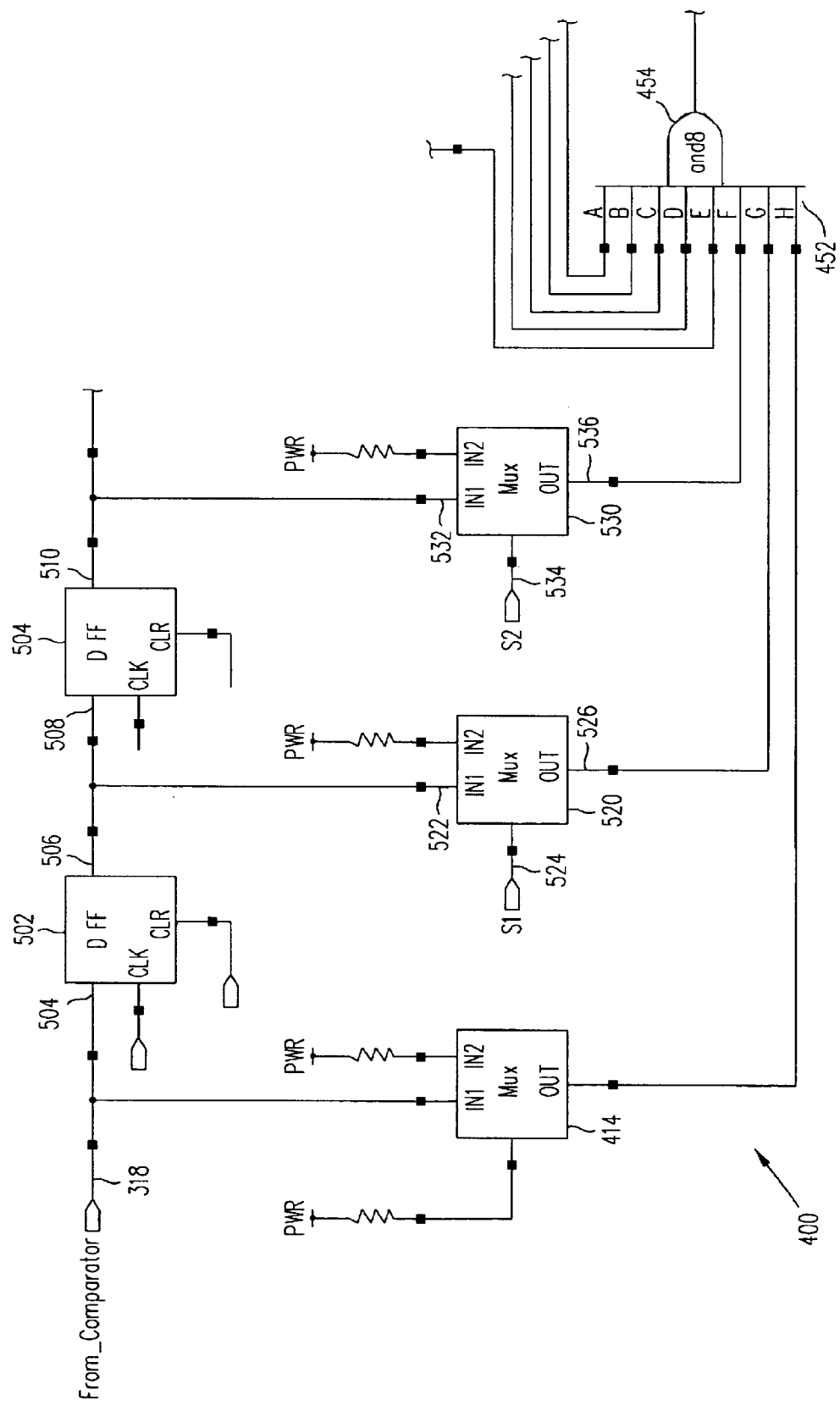
FIG. 5 is an enlarged view of the first stages of the pulse width filter shown in FIG. 4.
Figure 6:
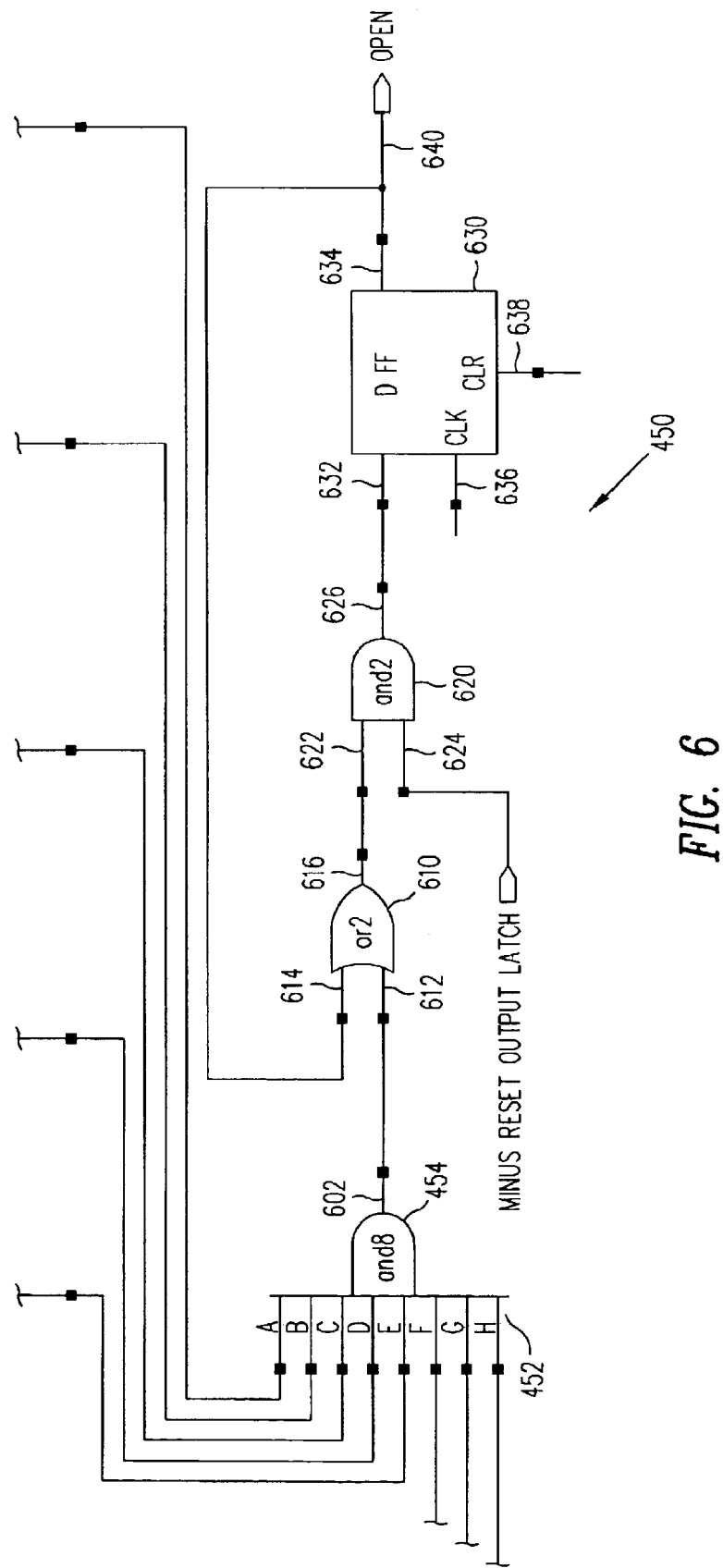
FIG. 6 is an enlarged view of the signal output logic of the pulse width filter shown in FIG. 4.

The pulse width filter 306 will now be described with reference to FIGS. 4–6. FIG. 4 depicts a schematic representation of the entire pulse width filter 306, FIG. 5 is an enlarged view of the first stages 400 of the filter 306 and FIG. 6 is an enlarged view of the signal output logic 450 of the pulse width filter 306. The pulse width filter 306 comprises a plurality (N=7 in the embodiment shown in FIG. 4) of D flip-flop (FF) circuits 402 connected serially, with the output 406 of each FF circuit connected to the input 404 of the next FF circuit in the series. The output signal 318 of the comparator 304 of FIG. 3 is connected to the input 320 of the first FF 402. The inputs IN1 408 of a plurality (N=7 in the embodiment shown in FIG. 4) of 2 to 1 multiplexer (MUX) circuits 410 are connected to the outputs 406 of the FF circuits 402. The input IN1 412 of an additional 2 to 1 MUX circuit 414 is connected to the output signal 318 of the comparator 304. The outputs 416 of each of the MUX circuits 410 and the MUX circuit 414 are each connected to one of the n+1 inputs 452 of an n+1 input AND circuit 454 of the signal output logic 450. Each of the D FF circuits 402 has a clock (clk) input 418 for receiving the write clock signal and a clear (clr) input 420 for receiving a clear signal from the write controller to set the FF circuit to a known condition at power on. Each of the 2 to 1 MUX circuits 410 has a second input (IN2) 422 set at a constant logic 1 input level and a control signal input 424 for a control signal (Sn, n=1 to N) to select either the IN1 or IN2 inputs of the nth MUX. When the control signal Sn is set at a logic 1 value, the IN1 input of the nth MUX is selected. When the control signal Sn is set at a logic 0 value, the IN2 input of the nth MUX is selected. Control signals, labelled serially S1, S2, - - - SN, may be individually set to a logic 0 or 1 level in order to set the filter 306 to the desired pulse width as described hereafter.

Referring now to FIG. 5, the operation of the first two stages 400 of the pulse width filter 306 will be described. A high (logic 1) output signal 318 from the comparator 306 is fed to input 504 of the first D FF circuit 502. The rising edge of the first write clock pulse after the signal 318 becomes high clocks the first D FF circuit 502 resulting in a high output signal at output 506. Because the signal transit time from input to output of the D FF circuits are finite (100–200 psec) compared to the rise time of the clock pulse, the high signal arriving at input 508 of the second D FF circuit 504 is not clocked by the first write clock pulse. If the signal at input 508 is still high when the rising edge of the second write clock pulse arrives, the second D FF circuit switches to a high value at output 510. It should be noted that the signal 318 need not be synchronous with the write clock pulse.

The output 506 of the first D FF circuit 502 is connected to the IN1 input 522 of the first MUX 520. With the control signal S1 at control signal input 524 set at a logic 1 level, the IN1 input of the first MUX is selected. A high output signal 506 at IN1 is selected and appears at the output 526 of the first MUX and on an input pin (G) of the 8 input AND circuit 454. Similarly, the output 510 of the second D FF circuit 504 is connected to the IN1 input 532 of the second MUX 530. With the control signal S2 at control signal input 534 set at a logic 1 level, the IN1 input 532 of the second MUX is selected. A high output signal 510 at IN1 is selected and appears at the output 536 of the second MUX and on an input pin (F) of the 8 input AND circuit 454.

The MUX 414 is set to always select the IN1 input connected to the input 504 of the first D FF circuit 502. The output 416 is connected to to an input pin (H) of the AND circuit 454. The purpose of the MUX 414 is to equalize the time delay of the output signal 318 of the comparator that is applied to the input of the AND circuit 454 to be the same as the delay from the outputs of the D FF circuits to the input of the AND circuit.

It is apparent from the description above with reference to FIG. 5 that the process of clocking the output signal 318 of the comparator at the first and second D FF circuits may be continued for each subsequent D FF circuit of FIG. 4. Thus, when the comparator output signal remains high, a third clock pulse will clock a high output of the third D FF circuit, the process continuing sequentially until a seventh clock pulse clocks a high output of the seventh and last D FF circuit of the pulse width filter. When all the control signals S1 through S7 are set to a logic 1 value, the high output signal appears at the output 416 of each of the MUX circuits 410 and at every input pin 452 of the 8 input AND circuit 454. In this case, it is apparent that the comparator output signal 318 has remained high for a period of 8 clock cycles. Since this period is sufficiently long for transients to have died out, a "true" open head condition may be assumed with a very high degree of confidence. The signal output logic 450 is used to generate an OPEN signal.

FIG. 6 depicts an enlarged view of the signal output logic 450 of the pulse width filter 306 shown in FIG. 4. The signal output logic 450 comprises an 8 input AND circuit 454, an OR circuit 610, a 2 input AND circuit 620, and a D FF circuit 630. The output 602 of the AND circuit 454 is connected to one input 612 of the OR circuit 610 and the output 616 of the OR circuit is connected to one input 622 of AND circuit 620. The output 626 of the AND circuit is connected to the input 632 of the D FF circuit 630. A MINUS RESET OUTPUT LATCH signal is supplied to a second input 624 of the AND circuit 620. The output 634 of the D FF circuit is connected to a second input 614 of the OR circuit and to an open signal output 640.

When all 8 inputs (A–H) 452 of AND circuit 454 are simultaneously high, the output 602 of the AND circuit goes high and the output 616 of the OR circuit 610 goes high. With a high MINUS RESET OUTPUT LATCH signal applied to the second input 624 of the AND circuit 620, both inputs to the AND circuit are high and the input 632 of the D FF circuit 630 is high. The rising edge of a write clock pulse at clock input 636 will clock the D FF circuit 630 to switch to a high value at output 634. The high output signal at 634 provides an OPEN signal indication at output 640 which is connected to the write controller circuitry (not shown). The high signal at output 634 appears at input 614 of the OR circuit 610 latching the output 616 at the OPEN signal value until the MINUS RESET OUTPUT LATCH is switched to a 0 value on input 624 resulting in the output 626 of the AND circuit 620 going low and switching the D FF circuit 630 to a low value at output 634 and at input 614 of the AND circuit 610 on the next positive transition of the write clock.

The D FF circuits, MUX circuits, AND and OR circuits used in the pulse width filter 306 are circuits well known to those skilled in the art, and therefore, will not be discussed in detail in the interests of brevity.

An advantage of the pulse width filter 306 of the present invention is that the duration of an open signal condition that must be detected before a "true" OPEN condition is verified may be selected in increments of a write clock cycle. This selection of the desired pulse width of the "true" OPEN signal is accomplished by suitable choice of the control signals S1 through S7 that are supplied to the MUX circuits 410. In the description above, all the control signals S1-S7 were set to a logic 1 value resulting in the IN1 input 408 of all the MUX circuits being selected. With this condition, the pulse width must be high for 8 clock cycles in order to obtain a high output from the 8 input AND circuit 454. The desired pulse width may be changed to a shorter time, for example to 4 clock cycles, by simply setting the programmable control signals S1, S2 and S3 to a logic 1 value and S4, S5, S6 and S7 to a logic 0 value resulting in the IN1 inputs 408 of the first three MUX circuits 410 and the IN2 inputs 422 of the last four MUX circuits in the series being selected. Since the IN2 inputs are all preset to have a constant logic 1 value, the outputs of the last four MUX circuits will all be high. A high output signal at the MUX circuit 414 and the first three MUX circuits 410 will now result in an OPEN signal indication. Similarly, any desired pulse width between 1 and 8 clock cycles may be selected. Alternatively, pulse widths longer than 8 write clock cycles may be obtained by adding a suitable number of D FF circuits 402 and MUX circuits 410 to the series illustrated in FIG. 4.

Another advantage of the present invention is having a self checking function that allows verification of the reliability of the open head detection operation. To carry out a self check of the open head detection operation, the reference voltage source 302 is adjusted to provide a test value of $V_{REF}$ 213 (Test $V_{REF}$ in FIG. 2) at the "+" input 314 of the comparator 304 that exceeds (is greater than) the normal value of the voltage signal 206 at the "−" input 316 of the comparator. When voltage at the "+" input 314 is greater than the voltage at the "−" input 314, the output 318 of the comparator 304 will go to a logic level 1 signaling an open head/cable condition. The comparator output signal 318 is processed by the pulse width filter 306 as described above to provide a latched open head signal 640 providing verification of the open head detection circuitry. After the self check is completed, the value of $V_{REF}$ at the "+" input of the comparator is reset to the preferred value ($V_{REF}$ 212) used to detect a true open head/cable condition. For the example shown in FIG. 2 with a voltage mode write driver, the preferred value of $V_{REF}$ is about 0.6 volts and the test value of $V_{REF}$ would be about 1.2 volt.

Figure 7:
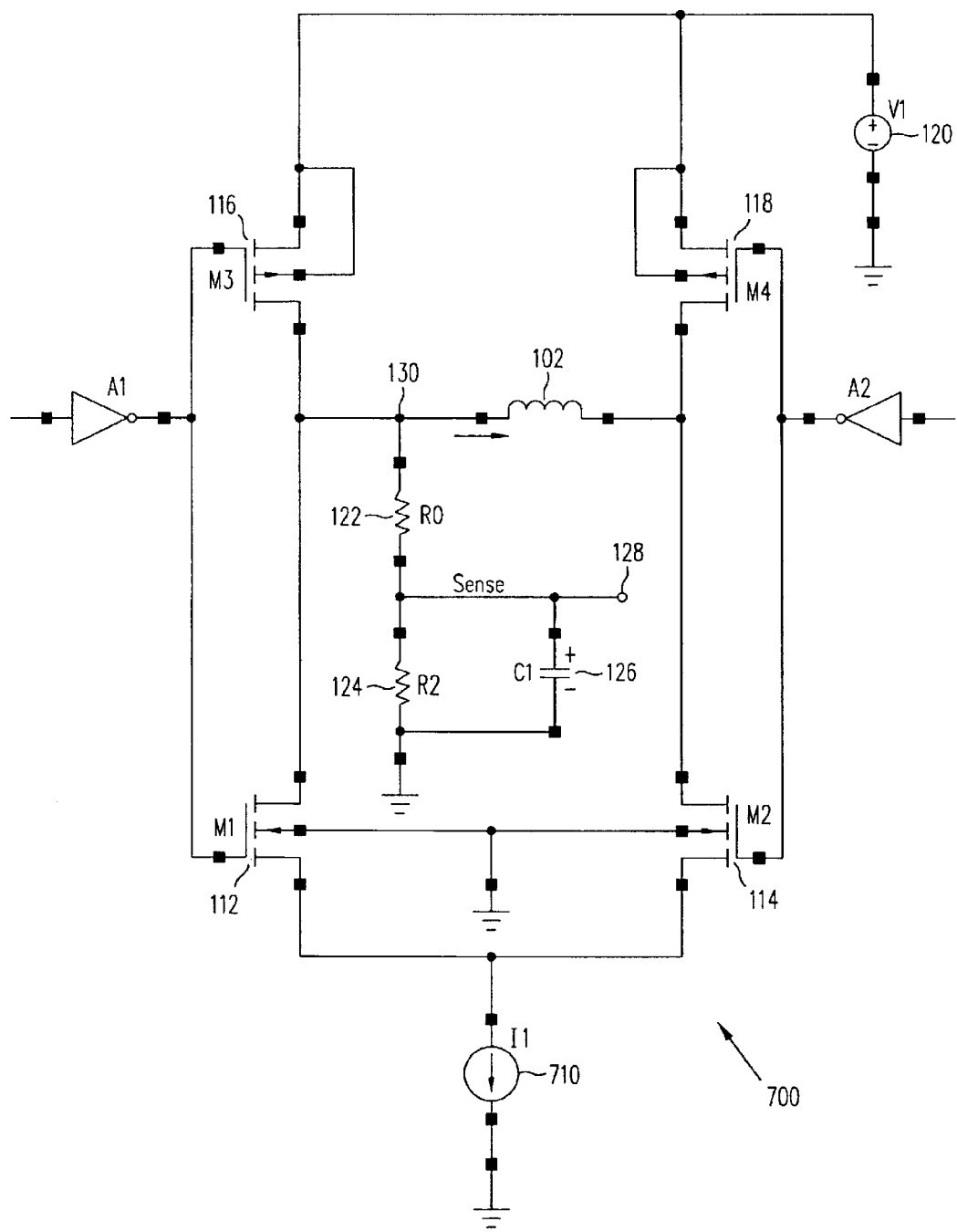
FIG. 7 is a schematic representation of an H configuration current mode write driver circuit having integral fault detection circuitry in accordance with the present invention.

FIG. 7 shows a schematic representation of a current mode H configuration magnetic write head driver circuit 700 according to a second embodiment of the present invention. The current mode driver circuit 700 is similar to the voltage mode driver circuit 100 shown in FIG. 1 excepting that series resistors R1 and R3 are eliminated and the source electrodes of nFETs M1 and M2 112, 114 are connected to a current source I1 710 instead of to ground. In current mode write driver 700, the current through the write head 102 is determined by the value of the current source 710. The voltage source V1 120 provides bias voltage to the pFETs M3 and M4 116, 118.

Operation of the current mode write driver 700 is the same as operation of the voltage mode write driver 100. As in the write driver 100, the resistors R0 122, R2 124 and capacitor C1 126 connected between node 130 and ground are used to provide a voltage sense signal at output 128.

Figure 8:
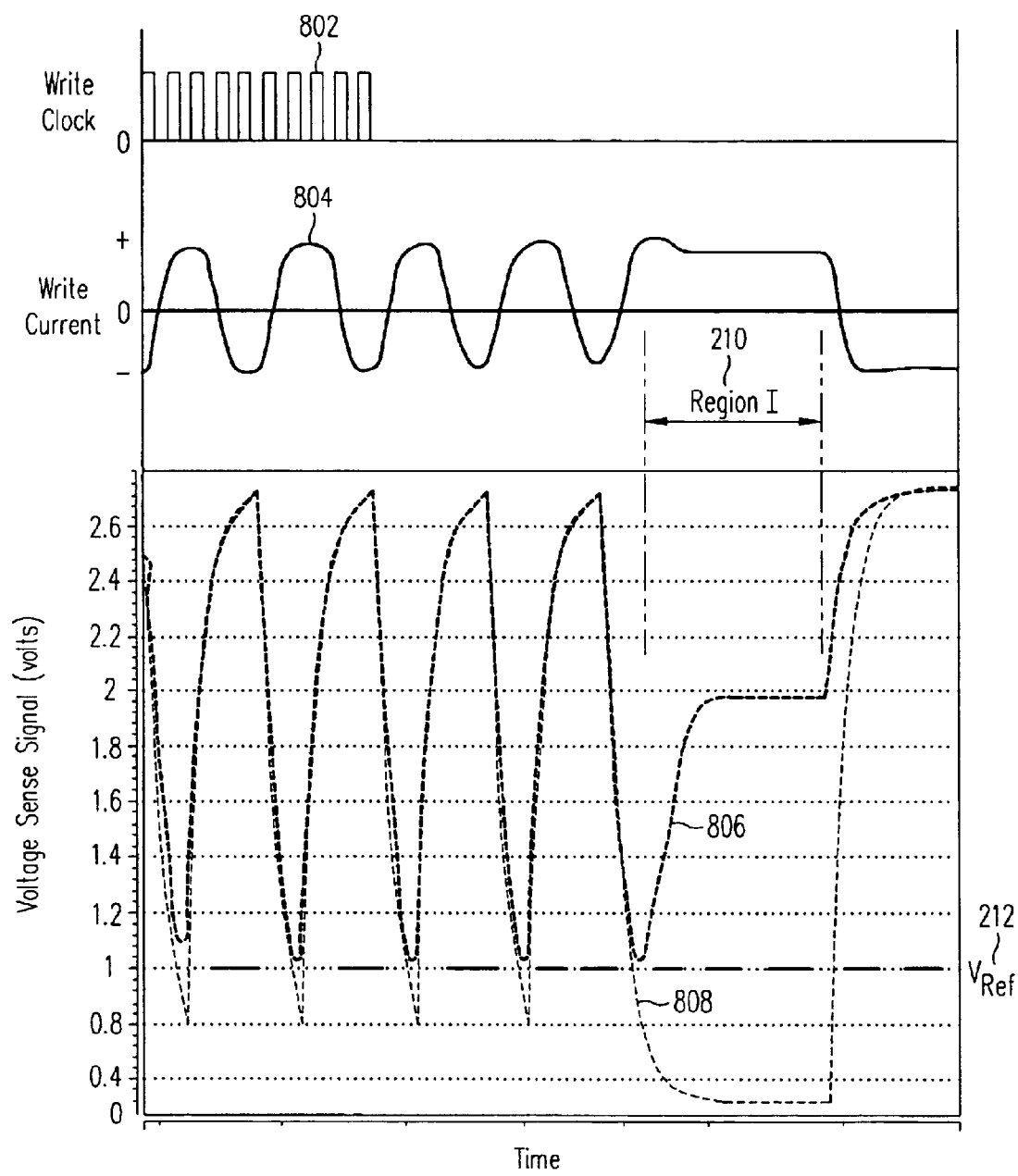
FIG. 8 is a timing diagram of certain signals appearing in the circuit shown in FIG. 7.

FIG. 8 is a timing diagram showing pictorial representations of the waveforms of the write clock signal 802, the write current 804 to the write head 102, and the resultant voltage sense signals 806 (normal) and 808 (open) measured at output 128 of the current mode write current drive circuit 700. Write clock signal 802 is a timing signal operating at a frequency in the range of 120–350 MHz. All logical actions in the write driver are clocked (timed) on a rising edge of the clock signal waveform 802. Voltage sense signal 806 is the signal measured at output 128 during normal operation of the circuit. Voltage sense signal 808 is the signal measured at output 128 when the write head 102 or a connection to the write head is open so that no write current can flow. The magnitude of $V_{REF}$ 212 is set in the range of 0.8–1.2 volt, preferably about 1 volt.

The circuitry and operation of the circuit 300 used to detect an open write head is the same for the current mode write driver circuit 700 as for the voltage mode write driver circuit 100. The voltage sense signal 806 or 808, depending on whether the head is normal or open, (see FIG. 8) on the output 128 of current mode write driver circuit 700 of FIG. 7 is connected to the "−" input 316 of comparator 304. The descriptions with reference to FIGS. 3, 4, 5 and 6 are identical for the current mode driver embodiment as for the voltage mode embodiment described above and will not be repeated in the interest of brevity.

Figure 9:
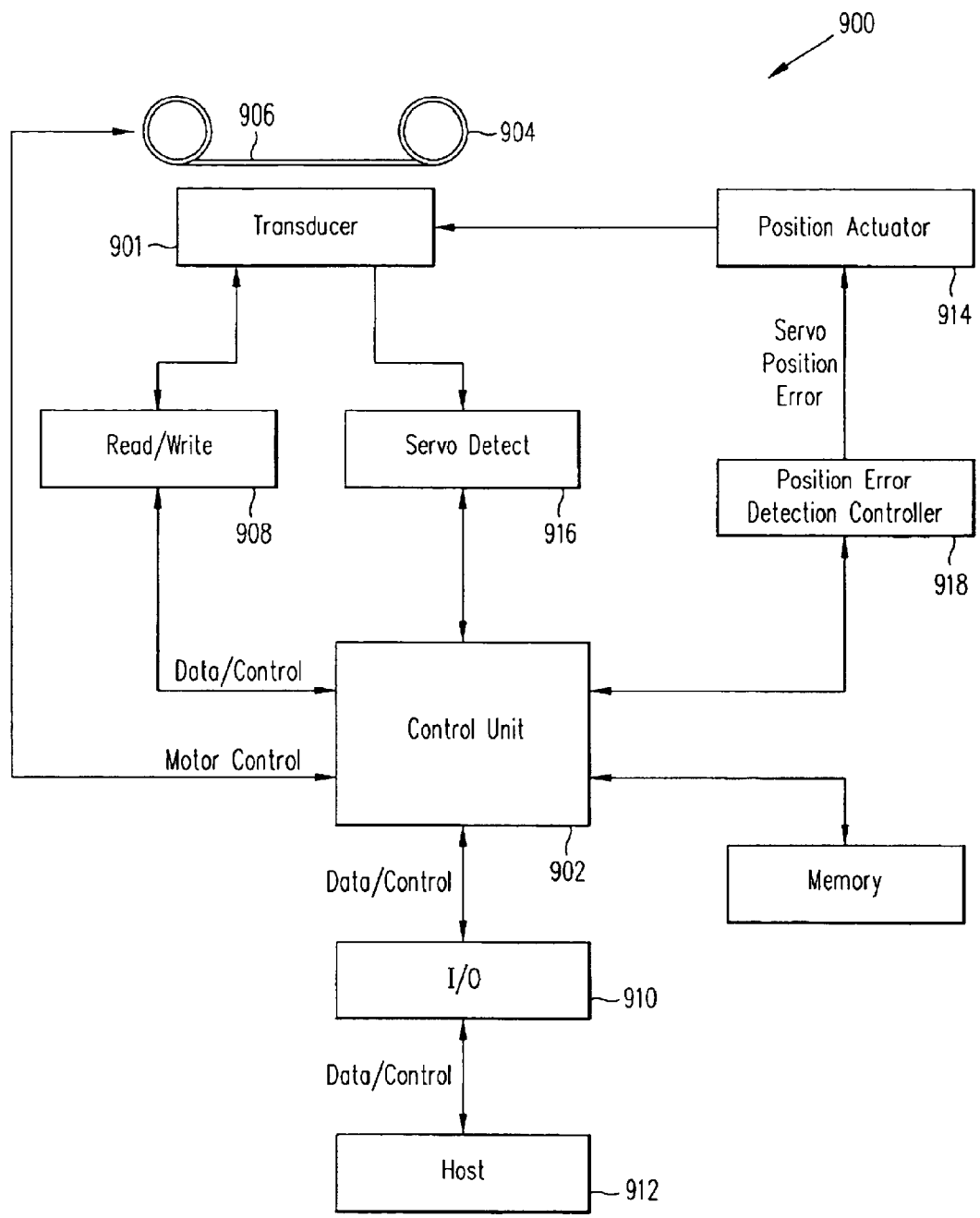
FIG. 9 is a simplified diagram of a magnetic tape recorder system using the magnetic write head driver having open write head detection circuitry of the present invention.

FIG. 9 illustrates an embodiment of a magnetic tape recorder or tape drive system 900 incorporating the open write head detection circuit 300 of the present invention. A tape drive control unit 902 provides a motor control signal to rotate tape reels 904 and move magnetic tape 906 across the read/write transducer head 901. Read/write channel 908 transmits read/write signals between the read/write transducer 901 and the control unit 902. The data is communicated through I/O channel 910 with host 912. Lateral positioning of the transducer 901 with respect to the tape 906 is accomplished by positioning actuator 914. The lateral repositioning is required to access the various tracks of the tape 906 with the transducer 901. A servo system may be employed for accurate lateral repositioning of the transducer 901. An exemplary servo system includes a servo detector 916 to detect both the track that the head is currently on and whether the head is off center. Control unit 902 indicates the track address of a desired new track to position error detection controller 918 for repositioning the head. Servo detector 916 indicates the current track to position error detection controller 918, and the controller provides a servo position error signal to positioning actuator 914 which repositions the transducer 901 to the new track. The servo system also provides track following signals to positioning actuator 914 so that the tracks on tape 906 may be closely spaced.

It will be apparent to those skilled in the art that the open write head detection circuit of the present invention may be used, alternatively, in a magnetic recording disk drive system having a read/write head using an inductive write head for writing data to magnetic media on a disk surface.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only as specified in the appended claims.

I claim:

1. An open write head detection circuit for a magnetic recording system, comprising:
   a write current driver circuit, wherein said write driver current circuit generates a write current to an externally connected write head, and wherein said write current driver circuit generates a sense signal in response to said write current;
   a comparator comparing said sense signal to a reference level and generating a comparator output signal indicative of whether the sense signal is greater or less than the reference level; and
   a pulse width filter generating a latched open head signal in response to the detection of the sense signal being less than the reference level for a predetermined time; and
   wherein the pulse width filter is clocked by a write clock signal for a predetermined number of write clock signal pulses to set said predetermined time.

2. The open write head detection circuit as recited in claim 1 wherein said write current driver circuit is a voltage mode write current driver circuit.

3. The open write head detection circuit as recited in claim 1 wherein said write current driver circuit is a current mode write current driver.

4. The open write head detection circuit as recited in claim 1 wherein said predetermined time is set to be sufficiently long to allow said sense signal to be greater than said reference level during normal operation.

5. The open write detection circuit as recited in claim 1 wherein said pulse width filter is programmable to set said predetermined time.

6. An open write head detection circuit for a magnetic recording system, comprising:
   a write current driver circuit, wherein said write driver current circuit generates a write current to an externally connected write head, and wherein said write current driver circuit generates a sense signal in response to said write current;
   a comparator comparing said sense signal to a reference level and generating a comparator output signal indicative of whether the sense signal is greater or less than the reference level; and
   a pulse width filter generating a latched open head sianal in response to the detection of the sense signal being less than the reference level for a predetermined time; and
   wherein said reference level is a programmable reference voltage.

7. An open write head detection circuit for a magnetic recording system, comprising:
   a write current driver means for generating a write current to an externally connected write head and for generating a sense signal in response to said write current;
   a comparator means for comparing said sense signal to a reference level and for generating a comparator output signal indicative of whether the sense signal is greater or less than the reference level;
   a pulse width filter means for generating a latched open head signal in response to the detection of the sense signal being less than the reference level for a predetermined time; and
   wherein said reference level is a programmable reference voltage.

8. A method of detecting an open write head in a magnetic recording system comprising the steps of:
   generating a sense signal in response to a write current in a write head driver circuit;
   comparing the sense signal to a reference level, wherein said reference level is a programmable reference voltage;
   generating a comparator output signal indicative of whether the sense signal is greater or less than the reference level;
   verifying that the sense signal is less than the reference level for a predetermined time; and
   generating a latched open head signal in response to verification that the sense signal is less than the reference level for the predetermined time.

9. The method of detecting an open write head as recited in claim 8 wherein the predetermined time is set as a programmable number of write clock signal pulses.

10. A magnetic tape recorder system, comprising:
   a magnetic recording tape;
   a read/write transducer head for magnetically recording data on the magnetic recording tape and for sensing magnetically recorded data on the magnetic recording tape, said read/write transducer head including a write and a read head in close proximity to the magnetic recording tape;
   an actuator for positioning said read/write transducer head to access various tracks on the magnetic recording tape; and
   a read/write channel coupled electrically to the write head for magnetically recording data on the magnetic recording tape and for reading data recorded on the magnetic tape, said read/write channel including an open head detection circuit comprising:

a write current driver circuit, wherein said write driver current circuit generates a write current to the write head, and wherein said write current driver circuit generates a sense signal in response to said write current;

a comparator comparing said sense signal to a reference level and generating a comparator output signal indicative of whether the sense signal is greater or less than the reference level; and a pulse width filter generating a latched open head signal in response to the detection of the sense signal being less than the reference level for a predetermined time.

11. The magnetic tape recorder system as recited in claim 10 wherein said reference level is a programmable reference voltage.

12. The magnetic tape recorder system as recited in claim 10 wherein said write current driver circuit is a voltage mode write current driver circuit.

13. The magnetic tape recorder system as recited in claim 10 wherein said write current driver circuit is a current mode write current driver.

14. The magnetic tape recorder system as recited in claim 10 wherein the pulse width filter is clocked by a write clock signal for a predetermined number of write clock signal pulses to set said predetermined time.

15. The magnetic tape recorder system as recited in claim 14 wherein said predetermined time is set to be sufficiently long to allow said sense signal to be greater than said reference level during normal operation.

16. The magnetic tape recorder system in claim 14 wherein said pulse width filter is programmable to set said predetermined time.

17. A method of verifying open write head detection operation of an open head detection circuit comprising the steps of:

generating a sense signal in response to a write current in a write head driver circuit;

setting a test reference level to a level greater than the sense signal;

comparing the sense signal to the test reference level;

generating a comparator output signal indicative of whether the sense signal is greater or less than the test reference level;

verifying that the sense signal is less than the test reference level for a predetermined time; and generating a latched open head signal in response to verification that the sense signal is less than the test reference level for the predetermined time.

* * * * *